US009052573B2

(12) United States Patent
Johnston et al.

(10) Patent No.: US 9,052,573 B2
(45) Date of Patent: Jun. 9, 2015

(54) VIDEO CAMERA MOTION STABILIZING DEVICE

(71) Applicant: STEADBITZ, LLC, Gainesville, FL (US)

(72) Inventors: David Johnston, Gainesville, FL (US); David Kaufman, Gainesville, FL (US); Samuel William Johnston, IV, Tampa, FL (US)

(73) Assignee: STEADBITZ, LLC, Gainesville, FL (US)

( * ) Notice: Subject to any disclaimer, the term of this patent is extended or adjusted under 35 U.S.C. 154(b) by 22 days.

(21) Appl. No.: 13/744,909

(22) Filed: Jan. 18, 2013

(65) Prior Publication Data

US 2014/0205276 A1 Jul. 24, 2014

(51) Int. Cl.
*G03B 17/56* (2006.01)

(52) U.S. Cl.
CPC .................................... *G03B 17/561* (2013.01)

(58) Field of Classification Search
CPC ....... F16M 13/04; F16M 13/00; F16M 11/04; F16M 11/12; G03B 17/56; G03B 17/563
USPC .......................................................... 396/421
See application file for complete search history.

(56) References Cited

U.S. PATENT DOCUMENTS

2004/0208498 A1* 10/2004 McKay ......................... 396/421
2011/0080563 A1* 4/2011 Greaves et al. ............... 352/243

OTHER PUBLICATIONS

Steadicam Camera Stabilizing Systems product information, [online, webpage, retrieved May 31, 2013] from: http://www.steadicam.com/, pp. 1-2.
Level Up Your iPhone Filmmaking With the Steadicam Smoothee product information, [online, webpage, retrieved May 31, 2013] from: http://www.wired.com/geekdad/2012/09/steadicam-smoothee/, pp. 1-4.
Hague MMC Steadicam Video Camera Steadycam Stabilizer product information, [online, webpage, retrieved May 31, 2013] from: http://www.ebay.com/itm/Haque-MMC-Steadicam-Video-Camera-Steadycam-Stabilizer-/380391853372, pp. 1-6.
Kickstarter Slingshot: Stabilizes smartphone video . . . and more! product information, [online, webpage, retrieved May 31, 2013] from: http://www.kickstarter.com/projects/1651425602/slingshot-stabilizes-smartphone-video-and-more, pp. 1-21.
iStabilizer ISTGL02 Glidepro Video Stabilizer—Retail Packaging—Black product information, [online, webpage, retrieved May 31, 2013] from: http://www.amazon.com/iStabilizer-ISTGL02-Glidepro-Video-Stabilizer/dp/B00895BXHM, pp. 1-3.

(Continued)

*Primary Examiner* — Rochelle-Ann J Blackman
(74) *Attorney, Agent, or Firm* — Saliwanchik, Lloyd & Eisenschenk

(57) ABSTRACT

A stabilizer apparatus for use with video devices that provides smooth video images. The stabilizer device comprises a gimbal system operably attached to a counterweighted pole. A video device operably attached to the top end of the pole can be balanced utilizing two or more opposing counter weights operably connected to the pole. The gimbal system is affixed to the pole and maintains the balance of the video device. A handle device attached to the gimbal system allows the stabilizer apparatus to be moved during video production, while maintaining the balance of the video device.

31 Claims, 14 Drawing Sheets

(56) References Cited

OTHER PUBLICATIONS

Balvanz Enterprises, Welcome to the DIY Garage product information, [online, webpage, retrieved May 31, 2013] from: http://www.balvanzenterprises.com/DIY-Garage/index.html, pp. 1-3.

Balvanz Enterprises, 3-Axis Camera Stabilizer Gimbal product information, [online, webpage, retrieved May 31, 2013] from: http://www.balvanzenterprises.com/DIY-Garage/3AxisCameraStabilizerGimbal.html?gclid=CN-Q85GezLMCFSOnPAodi2YA6Q, pp. 1-3.

Glidecam XR-Series product information, [online, webpage, retrieved May 31, 2013] from: http://www.glidecam.com/product-xr-series.php, pp. 1-9.

Cellphone Steadicam Rig Leaves No Excuse for Shaky Home Videos, [online, webpage, retrieved May 31, 2013] from: http://gizmodo.com/5447562/cellphone-steadicam-rig-leaves-no-excuse-for-shaky-home-videos, pp. 1-5.

MojoFloCam, A Stable Cam for Small Video Devices product information, [online, webpage, retrieved May 31, 2013] from: http://mojoflocam.com, pp. 1-2.

EEMOV Nano Cell Phone Stabilizer product information, [online, webpage, retrieved Dec. 3, 2012] from: http:www.tripodmarket.com/eemov-nano-cell-phone-stabilizer.html, pp. 1-3.

The Steadicam® Smoothee® Story product information, [online, webpage, retrieved Jun. 6, 2013] from: http:www.tiffen.com/steadicam_smoothee_home2.html, p. 1.

Steadicam® Merlin[2]—Better than Ever Stabilizing System, product information, [online, webpage, retrieved Jun. 6, 2013] from: http:www.tiffen.com/steadicam_merlin2.html, pp. 1-2.

The Tiffen Company, LLC, Steadicam Merlin[2] product brochure, pp. 1-2, Apr. 2005.

\* cited by examiner

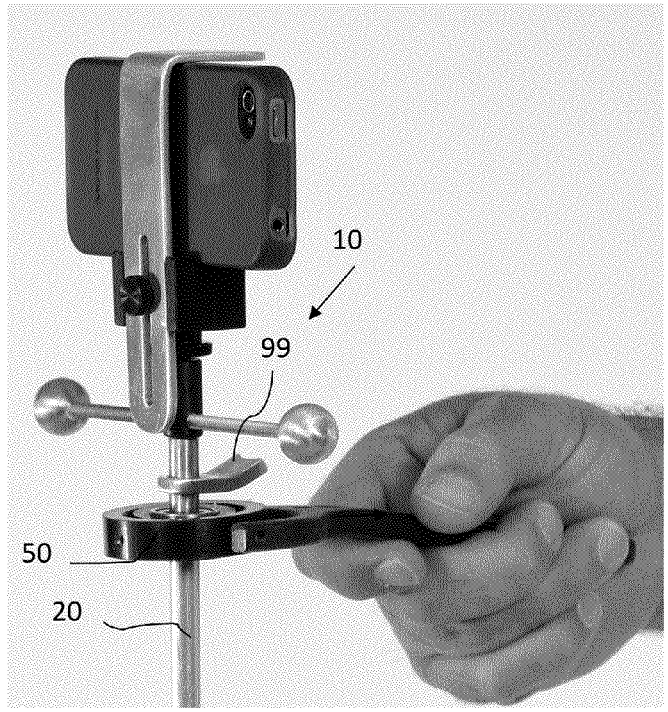
FIG. 13
FIG. 14
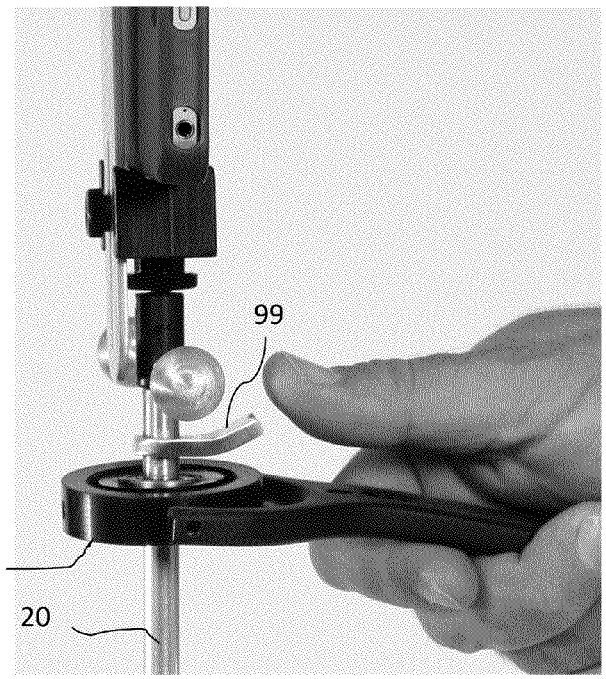

VIDEO CAMERA MOTION STABILIZING DEVICE

BACKGROUND OF INVENTION

Most of the handheld electronic devices in use today, such as the various types of cellular phones, include a camera, often with a high resolution. Some provide single-shot cameras, while others are configured with high quality video capabilities. This has encouraged thousands of people to become amateur film-makers and the World Wide Web is inundated with movie clips and video productions, colloquially called "videos," taken with these devices by individuals with little or no videographer skills.

One of the difficulties with using smaller video devices is in maintaining a horizontal horizon, due to lack of stability. Often, amateur videos taken with smaller devices are shaky and scenes are tilted because the video device was moved from one place to another. There are several stabilizer devices available that can be used to enhance stability of hand-held devices, particularly smaller video cameras. Most of these stabilizers utilize a handle attached to a 2-axis-gimbaled platform to which a video device can be attached. Various knobs can be used to tilt the platform or the video device can be adjusted on the platform to achieve the lateral balance necessary for a horizontal horizon, or other desired angle. Attached to the platform, there is usually an elongated arm with multiple interchangeable counter weights that provide stability and help compensate for changes in "rolling" motion, with the gimbaled platform, to maintain a proper horizontal horizon, even if the handle is moved during walking or other motions.

The current stabilizers often rely on the weight of an attached video device to maintain balance along with the gimbal in the lateral (side to side) or longitudinal (front to back) direction. This usually requires the video device to be precisely placed, so the weight is evenly distributed, with some minor corrections being made. But, it can be difficult to achieve the initial balance of the video device with the stabilizer. Further, as technology allows devices to be made smaller and lighter, it is more difficult to balance smaller, lighter devices, which can require multiple interchanges of weights on the stabilizer to achieve the desired angle with most stabilizers. Smaller and lighter video devices also tend to be more susceptible to external factors such as bumping of the stabilizer, wind effects, quick motion changes, etc. So, once balance has been achieved with a smaller device, it can be easily affected by changes in environmental conditions.

What is needed is a stabilizer that allows easy attachment and interchangeability of smaller video devices and an ability to make the incremental adjustments necessary to balance those smaller lighter devices. The stabilizer should also be able to minimize environmental or other factors that can affect the balance of smaller devices. A further advantage would be an ability to provide a full 360° of rotation.

BRIEF SUMMARY

Most of the electronic products utilized today are multi-task devices, which can function to making phone calls, access the internet, play games, take pictures with a digital camera, and even have digital video capture capabilities. While they excel at most of these capabilities, they usually lack any type of internal stabilizer. Thus, the photographs and digital video obtained with such devices usually suffer from shaky images, tilted horizons, disconnected scenes, and other videographic anomalies caused by movement of the device.

External stabilizers have been developed to minimize the effects of camera movement. However, current designs are not optimal for use with the smaller, lighter video-capable devices more often used today.

The subject invention successfully addresses the above described disadvantages associated with the previously known stabilizer devices and methods, and provides certain attributes and advantages that have not been realized by these known devices. In particular, the subject invention provides novel and highly effective methods and devices for stabilizing small image-capturing electronic devices to obtain quality digital video. With the devices and methods of the subject invention, a videographer can capture smooth videos with a stable horizon for more enjoyable viewing. The stabilizer of the subject invention can be used with larger video-dedicated devices, such as standard video or still cameras. But, the features of the stabilizer embodiments of the subject invention are particularly advantageous when employed with smaller devices, such as cell phones, like iPhones™, Smartphones™, or personal digital assistants (PDA), like a Blackberry™, and other multi-task, video-capable devices.

Embodiments of the subject invention utilize a counterbalance system to adjust a video device along two axis directions on an adjustable-length pole. Once balanced, a gimbal and pivoting handle operably attached to the pole can be used to hold and move the stabilizer, with the gimbal inhibiting motions that would affect the balance of the video device. For lighter video devices, the pole can be kept at a shorter length and heavier devices can be easier balanced with the pole at a longer length. With this device, a user can move the video device to give the impression of walking or flying through a scene without the scene becoming shaky or off-balance. Advantageously, the attachment of the handle to the length-adjustable pole with a gimbal can mimic a "camera jib" device. A camera jib is often used in the movie industry to move a camera in a vertical and/or horizontal direction through an extended arc and can provide a smoothly moving or "flying" sensation to a scene, and even appear to float over obstacles. The gimbaled handle can provide the same effect for small video devices with a full 360° of rotation, in two directions.

The stabilizer embodiments of the subject invention also allow for quick and easy attachment when transitioning from one video device to another. The counterbalance system can be used to quickly and easily adjust different devices and it can inhibit environmental effects that smaller devices are more susceptible to, such as wind, tapping of the device, rapid movements, etc. With the embodiments of the subject invention, hand-held video devices can be used to achieve professional looking video images without a high level of technical skill.

Other aspects and further scope of applicability of the present invention will become apparent from the detailed descriptions given herein. It should be understood, however, that the detailed descriptions, while indicating preferred embodiments of the invention, are given by way of illustration only, since various changes and modifications within the spirit and scope of the invention will become apparent from such descriptions.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings and photographs. The figures presented herein may not be shown to scale and any reference to dimensions in the figures or the following description is specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 13 is a photograph of a left front view of a stabilizer apparatus according to the subject invention. Shown here is a thumb guard affixed to the pole.

FIG. 14 is a photograph of a left side elevation view of a stabilizer apparatus according to the subject invention. This photographs shows how the thumb guard can be used in conjunction with the handle of the apparatus to manipulate the position of a video device.

DETAILED DISCLOSURE

The subject invention describes embodiments of a stabilizer apparatus. More specifically, the subject invention provides one or more embodiment(s) of a stabilizer apparatus useful for smaller, hand-held devices that are capable of video production. However, a person with skill in the art will be able to recognize numerous other uses that would be applicable to the apparatuses and methods of the subject invention. While the subject application describes, and many of the terms herein relate to, a use for small hand-held camera- or video-capable devices, other uses and modifications apparent to a person with skill in the art and having benefit of the subject disclosure are contemplated to be within the scope of the present invention.

In the description that follows, the term "video device" is used merely for literary convenience. The term should not be construed as limiting in any way. As used herein, a video device can include any hand-held or portable device capable of photographic and/or video production. This can include, but is not limited to, video cameras, cell phones, gaming devices, smart phones, personal digital assistants (PDA), portable media players, digital cameras, global position system (GPS) devices, and any other such devices capable of capturing or showing images.

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical or remote.

Finally, reference is made throughout the application to the "proximal end" and "distal end." As used herein, the proximal end is that end of the stabilizer apparatus to which a video device can be attached. Conversely, the distal end is that end furthest away from an attached video device or the end that would be closest to the ground when the stabilizer apparatus is balanced.

The present invention is more particularly described in the examples presented herein that are intended to be illustrative only since numerous modifications and variations therein will be apparent to those skilled in the art. As used in the specification and in the claims, the singular for "a," "an" and "the" include plural referents unless the context clearly dictates otherwise.

Figure 1:
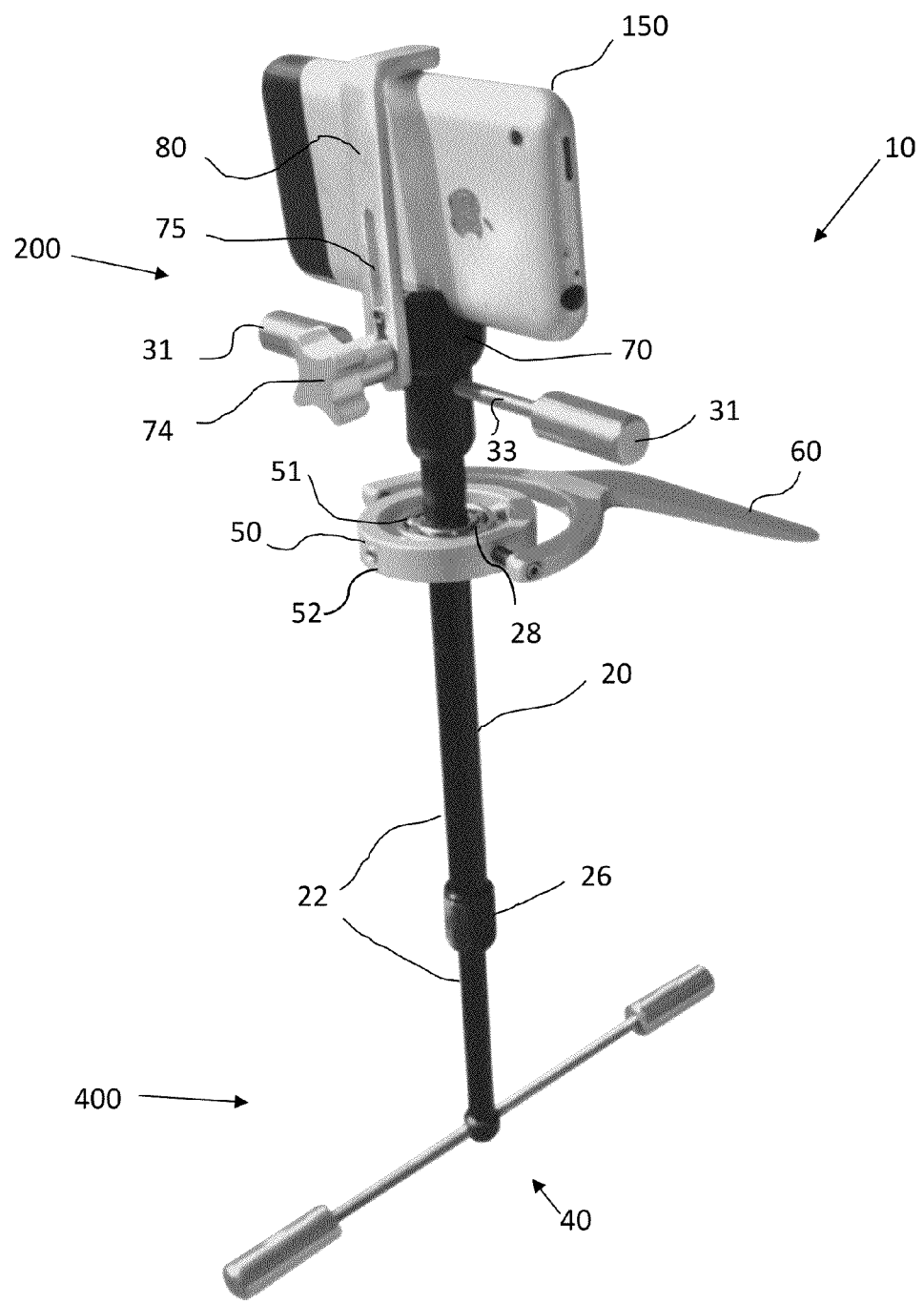
FIG. 1 is photograph of a left side front perspective view of a stabilizer apparatus embodiment according to the subject invention, with an operably attached video device.
Figure 2A:
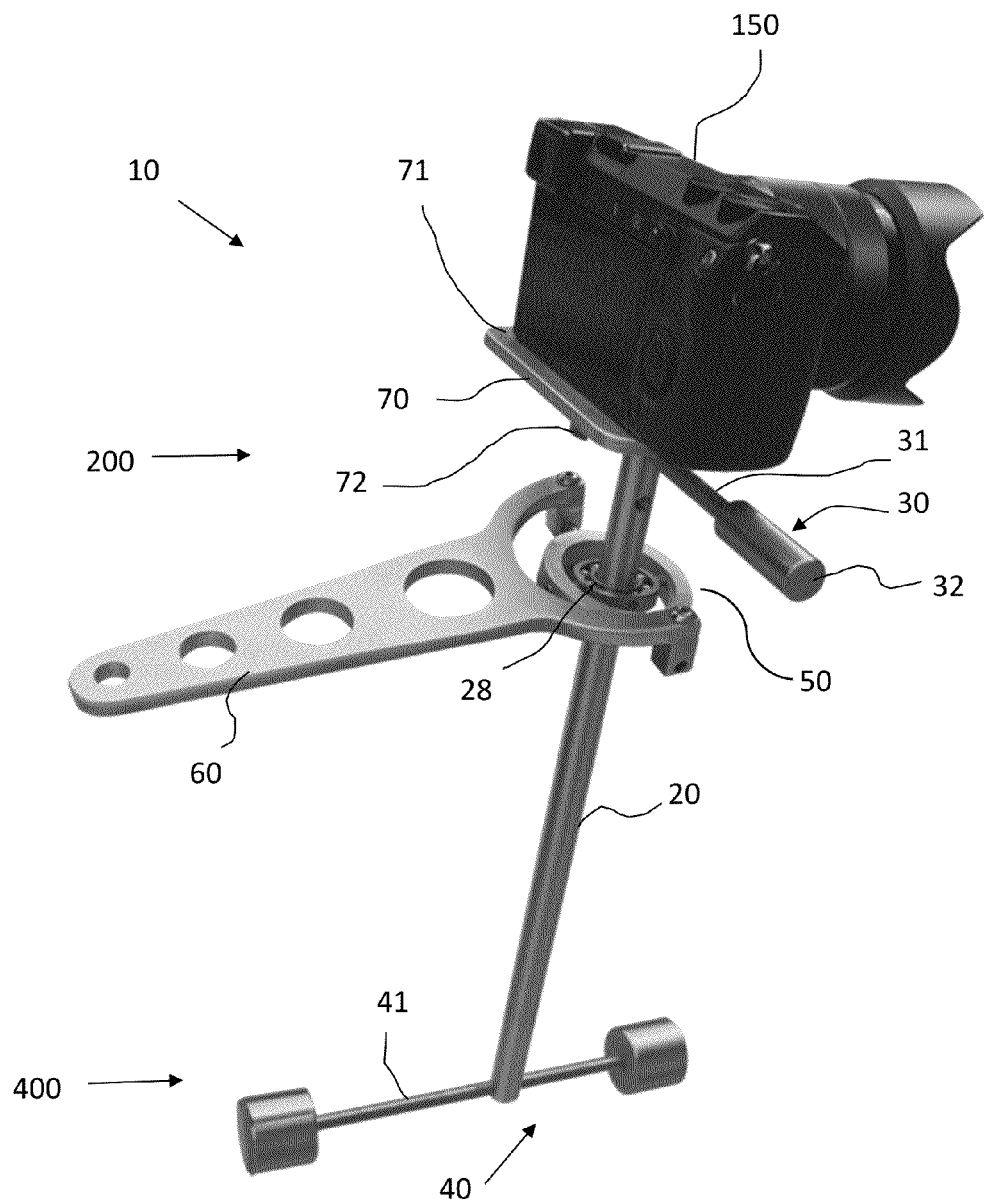
FIG. 2A is a photograph of a right side rear perspective view of a stabilizer apparatus embodiment according to the subject invention, with an operably attached video device.
Figure 2B:
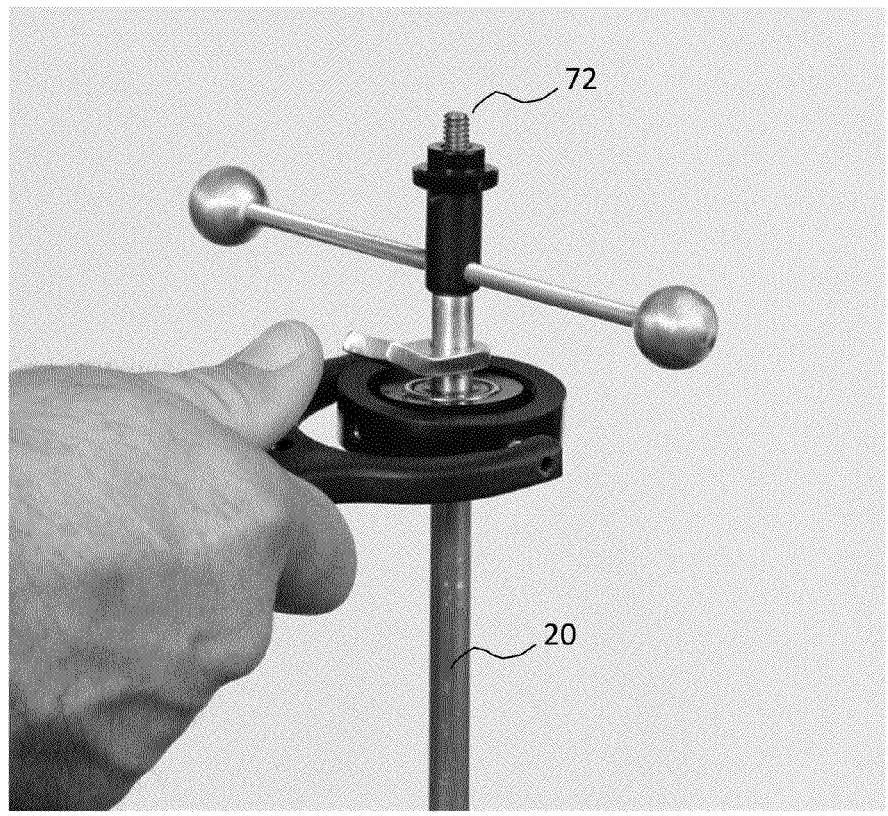
FIG. 2B is a photograph of stabilizer apparatus embodiment according to the subject invention showing the pole with threaded screw mechanism for coupling directly to a video device.
Figure 2C:
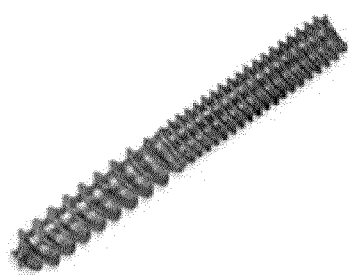
FIG. 2C is a photograph showing one embodiment of a dual-headed screw that can be utilized with embodiments of the subject invention.
Figure 3:
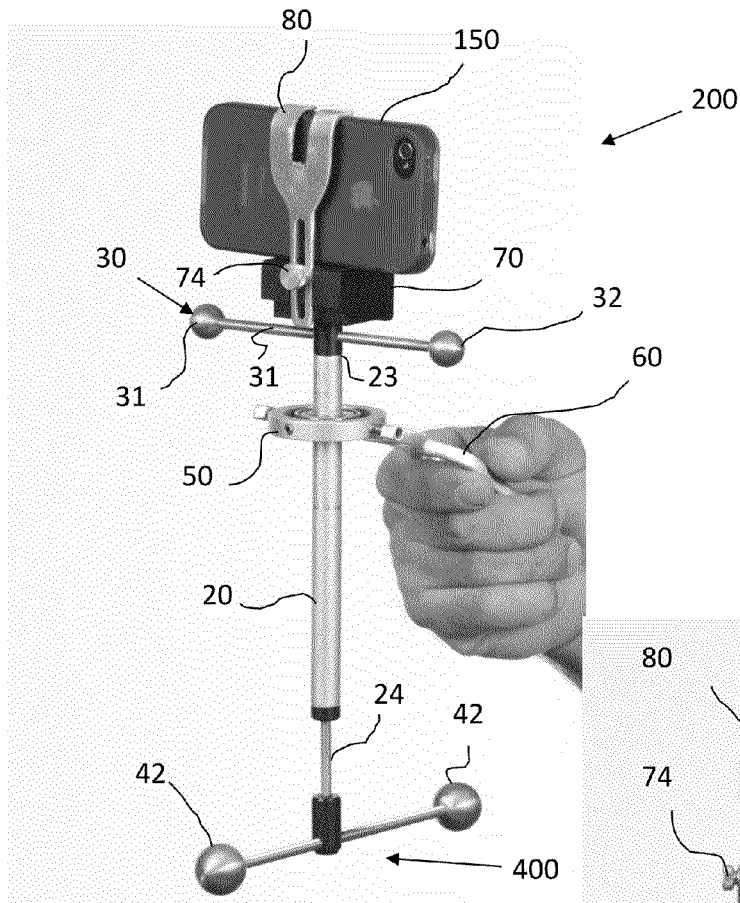
FIG. 3 is a photograph of a left side front perspective view of a stabilizer apparatus embodiment according to the subject invention, with an operably attached video device. Note that FIGS. 1, 2 and 3 illustrate different types and sizes of video devices operably attached to the embodiments according to the stabilizer apparatus.

Reference will be made to the attached figures on which the same reference numerals are used throughout to indicate the same or similar components. With reference to the attached figures, which show certain embodiments of the subject invention, it can be seen that the subject invention pertains generally to a stabilizer apparatus 10 generally comprising, among other components, a length-adjustable pole 20, with an operably attached counterbalance system 15, which can include at least an upper counterweight 30 and a lower counter weight 40. Also operably attached to the pole is a gimbal 50 and a handle 60. The proximal end 200 of the stabilizer apparatus is configured with a platform 70 to which a video device 150 can be attached. In an exemplary embodiment, the platform includes an adjustable arm 80 for securing a video device. FIGS. 1, 2 and 3 illustrate non-limiting examples of different types of photographic and video-capable devices that can be utilized with embodiments of the subject invention.

With reference to the figures, it can be seen that the device can employ a pole 20 to which components are attached. A pole can be substantially linear, such as shown, for example, in the attached figures, or a pole can have any of a variety of curves, angles or other shapes. In one embodiment, a pole is of pre-determined length, an example of which is shown in FIG. 2A. In an exemplary embodiment, a pole is of adjustable length. In one embodiment, a pole has one or more parallel or collinear sections 22 that can be moved to adjust the length of the pole. In a particular embodiment, a pole has one or more telescoping sections 22 that can be adjusted to modify the length of the pole. In another embodiment, one or more sections 22 have continuous threading 24 that allow them to be turned or screwed, such as, for example, into or out of another section, to adjust the length of the pole. FIG. 3 illustrates one example of a pole with a threaded section 22 that can be turned or screwed to adjust the overall length of the pole. In a further embodiment, the one or more sections can be locked into place to at least temporarily secure the desired length of a pole. FIG. 1 illustrates an embodiment having telescoping sections that engage with a lock 26 to secure the length of the pole. Adjustable length poles are known in the art and it is within the skill of a person trained in the art to determine any of a variety of devices and methods for adjusting the length of a pole, according to the subject invention. Thus, such variations which perform the same function, in substantially the same way, with substantially the same result are within the scope of the subject invention.

The required length of a pole 20 can depend upon the configuration of the counterbalance system 15, such as, for example, the size of the counterweights that are attached, the position of a gimbal 50, the weight of a video device utilized therewith, and other factors that are understood by persons with skill in the art. In one embodiment, the length of a pole 20 is between, or can be adjusted to be between, approximately 5.0 inches and approximately 2.0 feet. In a more specific embodiment, the length of a pole 20 is between, or can be adjusted to be between, approximately 6.0 inches and 1.5 feet.

Ideally, a pole is maintained in a position that provides a video device 150 attached to the platform 70 the proper viewing or longitudinal angle. Most of the time, it is desirable for a video device to be operated with a minimum longitudinal angle and with a horizontal left to right angle, often referred to as a horizontal horizon. This usually entails maintaining a pole 20 in a substantially vertical position. It is also desirable to minimize random jerks, shakiness, or other random movements, especially while moving a video device, which translate to the image and detract from the quality of the production.

In one embodiment, a gimbal structure is affixed to the pole, so as to maintain the pole in a substantially vertical position. Gimbal structures are often utilized to maintain a device at a particular orientation. They operate by correcting for at least two directions of three possible directions of motion, or the "yaw," "pitch," and "roll," during movement. One embodiment of the subject invention, utilizes a gimbal system to compensate for changes in the roll and pitch of the device during movement of a video device. In a more specific embodiment, a single-axis 2-ring gimbal 50, or an equivalent structure thereto is attached to the pole 20. In the embodiments of the subject invention, the 2-ring gimbal structure can essentially maintain the pole, which is fixedly attached within the center ring, in a substantially vertical position. FIGS. 1, 2, 4, 6 and 8 illustrate non-limiting examples of single-axis 2-ring gimbals with a handle, according to embodiments of the subject invention.

In a particular embodiment, the 2-ring gimbal 50 provides up to 4-degrees of freedom. The central ring 51 can compensate for changes in "roll" of a video device and allows the pole 2-degrees of freedom, such that, when being moved, it automatically pivots or swings itself left to right, e.g., laterally, to maintain the visual horizon of a video device 150, which is usually a horizontal horizon. In a further particular embodiment, the outer-ring 52 simultaneously compensates for any changes in the "pitch" of a video device and allows the pole two additional degrees of freedom, such that when being moved, it automatically pivots or swings in a forward-and-aft, e.g., longitudinal direction, to maintain the visual angle of the video device, usually parallel to the ground. Thus, an embodiment of the subject invention provides a 4-degrees of freedom gimbal arrangement.

Many gimbals include a third ring or additional axis that compensates for the "yaw" or motion-about-the-axis and provide an additional 2-degrees of freedom, or a total of 6-degrees of freedom. The embodiments of the subject invention also provide an additional 2-degrees of freedom, but utilize an advantageous arrangement that provides a full-360 degrees of axial motion. In one embodiment, the pole is mounted on one or more bearings 28 that are operably attached to the central gimbal ring 51. The bearings can advantageously allow the pole to spin axially or "yaw" a full 360° in two directions. FIGS. 1 and 2 illustrate embodiments utilizing bearings in the central gimbal ring to rotatably secure the pole. In a more particular embodiment, the pole is mounted on one or more bearing rings. A bearing ring can have any number of bearings to provide axial motion to the pole. In an alternative embodiment, the pole is mounted on one or more surface contact bearings, which have low friction surfaces, as opposed to moving parts or bearings that contact the pole and provide rotation. A person trained in the art would be able to determine any of a variety of bearing types or arrangements that could be utilized with the embodiments of the subject invention. Such variations that perform the same function, in substantially the same way, with substantially the same result, are within the scope of the subject invention.

It can be preferable in some circumstances for the axial rotation of the pole to be limited. In one embodiment, the bearing can have one or more bearing stops 29 that limit axial spin of the pole, so that the pole realizes less than a full 360° turn, while being supported by the gimbal. In a further embodiment, the bearing stops can be removable or adjustable, so that the axial rotation can be changed for a particular situation. Bearing stops and their uses are known in the art. The type of bearing utilized with the invention, as described above, can dictate the type of bearing stop utilized. Such bearing stop modifications are within the scope of the subject invention.

Thus, the gimbal and bearing apparatus embodiments of the subject invention are able to compensate and correct change in the roll, pitch, and yaw movements of a video device. A video device affixed to an embodiment of the subject invention can be maintained in a position that has a horizontal axis, any desired up or down angle of view, and can spin freely about the central axis. Gimbals with additional axes and rings, such as, for example, a 2-axis 3-ring gimbal or 3 axis 4-ring gimbal, can also be utilized with the embodiments of the subject invention. Additional gimbal rings can inhibit gimbal-lock, a recognized phenomenon of gimbals, by providing additional yaw, pitch, and roll compensation. Gimbals, and similarly operating devices, and their use for maintaining apparatuses at a proper horizontal or vertical angle are well-known in the art. Such variations that perform the same function, in substantially the same way, with substantially the same result are within the scope of the subject invention.

With the embodiments of the subject invention, a video device is typically placed at, or about, the proximal end 200 of the pole 20. In particular, a video device is often placed proximal to the gimbal structure 50. There are various mechanisms by which a video device can be demountably attached to a pole. In one embodiment, a platform 70 is attached to the pole, at, or about, the proximal end. In a specific embodiment, a platform 70 is attached to the most proximal end of the pole 20. The platform, in general, provides a surface 71 on which a video device can be placed. A platform can have any of a variety of shapes or dimensions. It can also include various ergonomic structures or mounting features, such as, for example, ridges or grooves that can interdigitate with compatible structures on a video device, or that have a shape that simply aids in securing it to one place.

Figure 6:
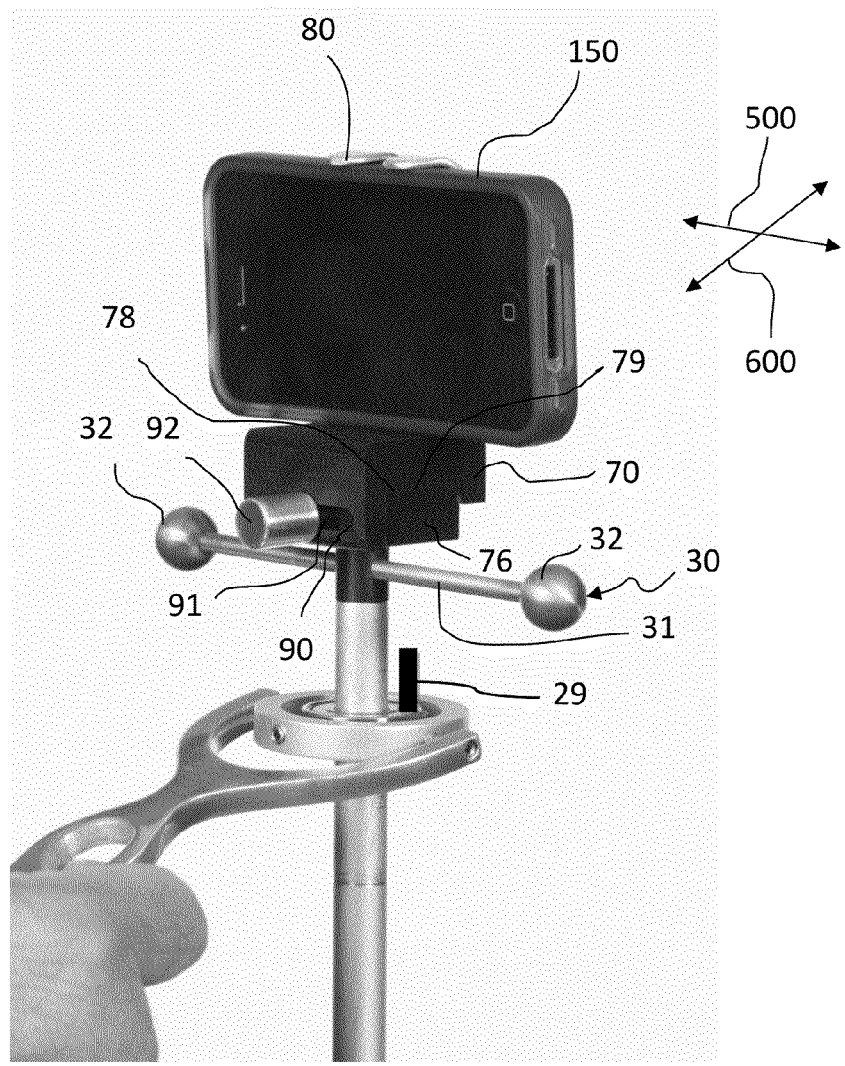
FIG. 6 is a photograph of a rear right side perspective view of the proximal end of a stabilizer apparatus embodiment according to the subject invention, with an operably attached video device.

In a particular embodiment, the mechanism of demountable attachment comprises a platform having two or more cooperatively engaged components. The first component is a pole mount block 76 that can be immovably affixed proximal to the gimbal, or, more particularly, at or about the proximal end of a pole 20. The second component is a movable carriage 77 that can be cooperatively engaged with the mount block. In one embodiment, the carriage and the pole mount block are slidably engaged, such that a video device secured on a surface 71 of the carriage can be moved relative to the mount block. In one embodiment, the carriage can be moved in a lateral direction 500. In an alternative embodiment, the carriage can be moved in both a lateral direction 500 and in a longitudinal direction 600, which are illustrated in FIG. 6.

Figure 4:
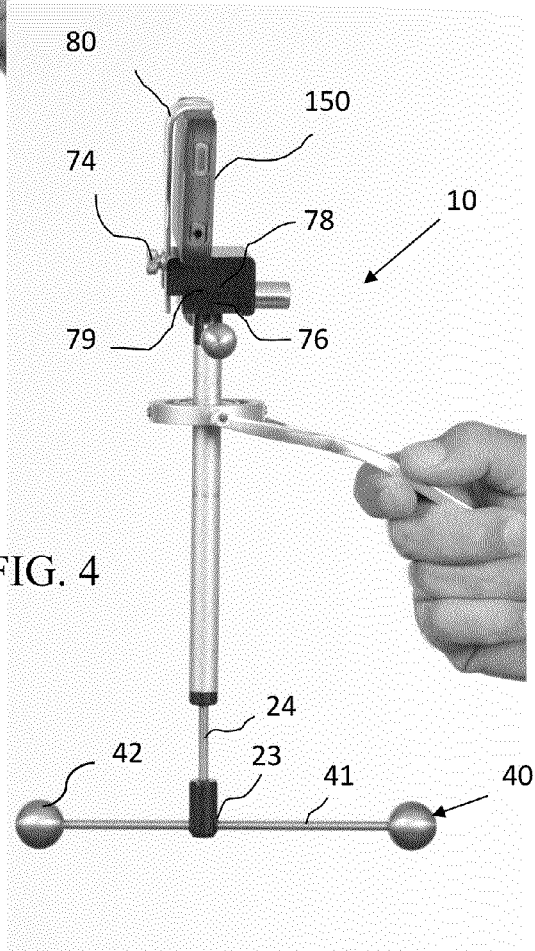
FIG. 4 is a photograph of a left side elevation view of a stabilizer apparatus embodiment according to the subject invention, with an operably attached video device.

The movement of the carriage can be achieved by any of a variety of devices and techniques known to those with skill in the art. Ideally, the carriage can be moved in increments that allow for precise adjustment of the position of a video device relative to the pole 20. In one embodiment, the carriage has a generally horizontal planar surface 78 that slides cooperatively against a generally horizontal planar support 79 on a pole mount block, an example of which is shown in FIGS. 4 and 6. The carriage position can be moved by hand to achieve the desired balance. Alternatively, a mechanical mechanism, such as, by way of example, a gear mechanism, can be operably connected to the platform to adjust a carriage. In a further embodiment, the position of the carriage on a pole mount block, once optimized, can be temporarily locked into place. In a particular embodiment, the carriage can include a bolt and slot mechanism that utilizes an elongated opening 90 that corresponds with a groove 91 in the pole mount block. A bolt 92 can be cooperatively engaged with the opening 90 and the groove 91 so that by turning the bolt, the carriage and pole mount block, or some portion thereof, are squeezed together, such that the frictional force therebetween prevents them from continuing to slide relative to each other. A person with skill in the art can determine numerous devices and methods by which a carriage can be movably operably connected to a pole mount and secured to hold a position. Such variations which provide the same function, in substantially the same way, with substantially the same result are within the scope of the subject invention.

Needless to say, it is important that a video device be demountably secured to a platform on the pole, in particular, proximal to the gimbal. Depending upon the video device utilized, the mechanism(s) of demountable attachment can vary. In an ideal embodiment, a video device is demountably coupled to the platform so that there is minimal or no movement of the video device on the platform. In other words, the video device, once coupled to the platform, preferably does not shake, rotate, or otherwise move relative to the platform. Some video devices are configured with apertures, such as, by way of non-limiting example, continuous thread bores, into which rods or screws can be inserted to secure the video device to various supports, like tripods, stand, jibs, booms, etc. Depending upon the video device, the mechanism of attachment could directly attach a video device to the pole without use of a platform. In one embodiment, the mechanism of demountable attachment is a pole 20 with various openings or threaded screw holes into which a video device can be directly coupled. However, not all video devices have built-in attachment mechanisms and can require other types of coupling devices or attachment mechanisms for coupling to a platform.

In one embodiment, a platform is configured with at least one screw mechanism 72 for demountably coupling a video device to a platform. A screw-mechanism can include a continuously threaded screw that can traverse a bore hole within the platform to couple with a compatible continuous threaded bore hole on a video device. FIG. 2A illustrates a non-limiting example of a video device secured to a platform by a screw mechanism.

In an alternative embodiment, the screw mechanism can be fixedly attached to the proximal end of the pole, without benefit of a platform. FIG. 2B illustrates an embodiment of a pole 20 having a screw mechanism 72 extending from the proximal end. With this embodiment, a video device, by means of its screw-hole, can be coupled directly to the screw mechanism 72 pole. Unfortunately, video device screw-hole sizes are not currently standardized in the industry. Therefore, it may be necessary for the size of the screw mechanism to be adjustable to accommodate different devices. In one embodiment, the screw mechanism is removable from the pole so that screw mechanisms of different sizes can be attached. In a further embodiment, the screw mechanism is a dual-headed screw, such that one end can be coupled to compatible threading within the pole and the opposite end can be coupled to a screw-hole in a video device. Thus, the diameter of the one end of a dual headed screw can be different than the opposite end. With this embodiment, multiple dual-headed screws having opposite ends with different size diameters can be provided for coupling a video device to a pole. FIG. 2C illustrates one example of a type of dual headed screw that can be utilized with the pole embodiment shown in FIG. 2B. One end can screw into the proximal end of the pole and the opposite end can be screwed into the screw-hole of a video device.

Figure 5:
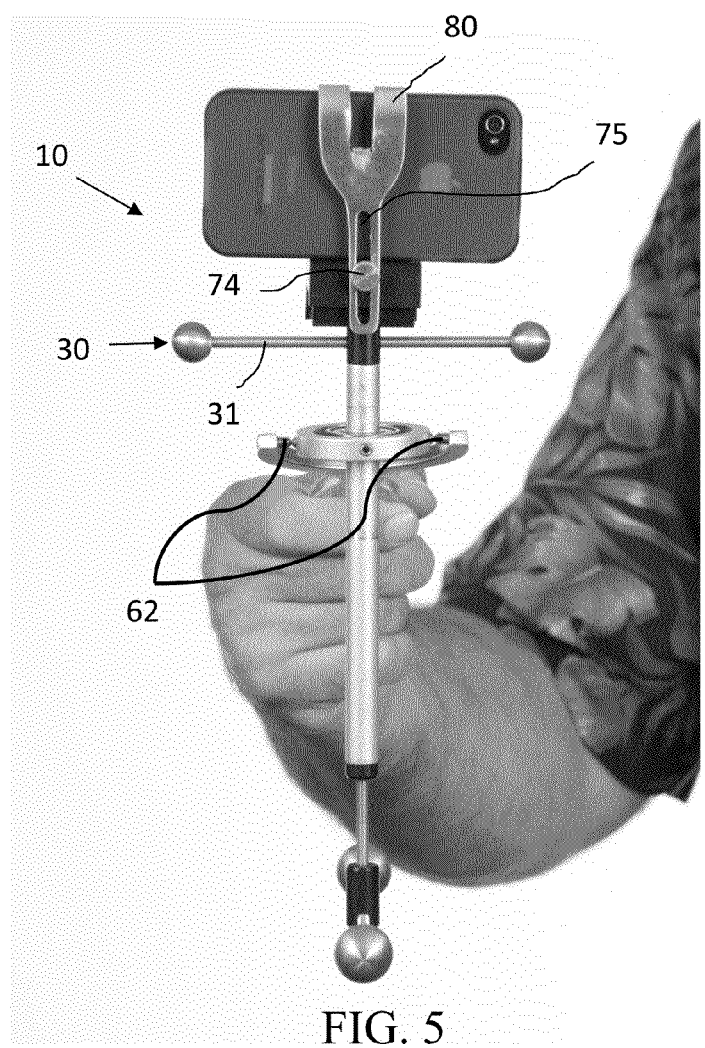
FIG. 5 is a photograph of a front elevation view of a stabilizer apparatus embodiment according to the subject invention, with an operably attached video device. This photograph shows how the stabilizer device can be held for operation.
Figure 10:
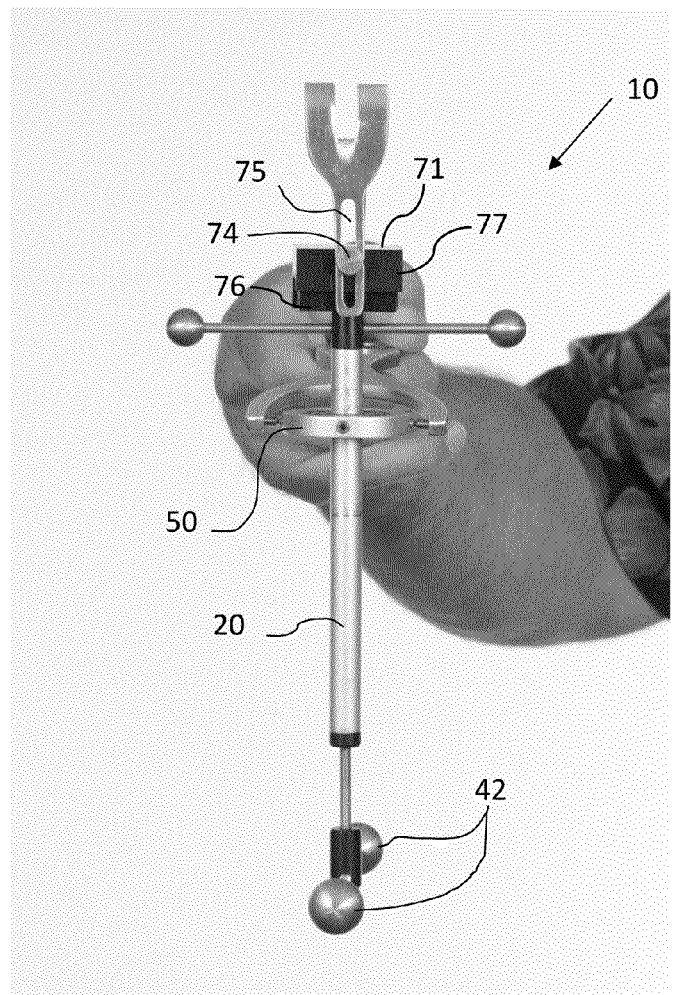
FIG. 10 is a photograph of a front elevation view of a stabilizer apparatus according to the subject invention. This photograph shows how the stabilizer apparatus can remain balanced when being held.
Figure 11:
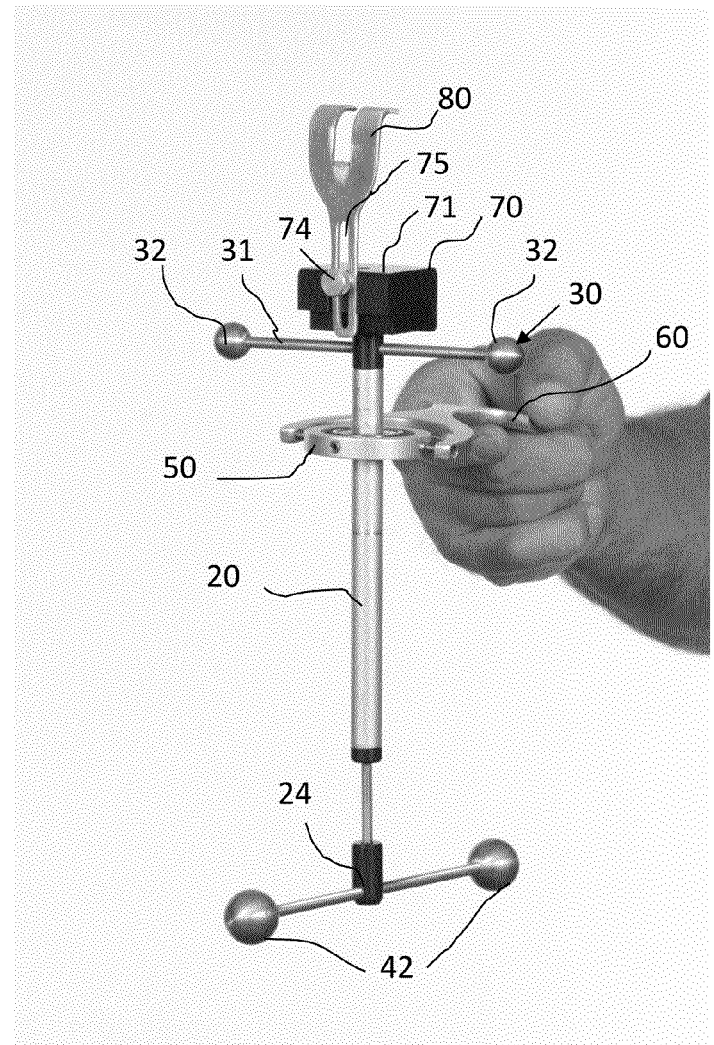
FIG. 11 is a photograph of a left side front view of a stabilizer apparatus according to the subject invention. This photograph shows the stabilizer apparatus being held while remaining balanced.

In another embodiment, one or more adjustable arms 80 can be used to demountably secure a video device to a platform. Adjustable arms can be used to press or squeeze against a video device to hold it against a platform. In one embodiment, at least one adjustable arm 80 is mounted vertically to a platform. FIGS. 10 and 11 illustrate an example of a platform with an adjustable arm attachment. Adjustable arms can have a shape that is conducive to cooperatively engaging with a video device. For example, an adjustable arm can be bent or curved at one end so that it conforms to the shape of a video device. FIGS. 3, 4, 5, and 6 illustrate an embodiment of an adjustable arm having a bend that conforms to the shape of a video device. Adjustable arms can be made adjustable in any of a variety of ways. In one embodiment, a lug 74 is emplaced within a slot 75 in an adjustable arm. This can permit a vertically mounted adjustable arm to be moved proximally 200 or distally 400 as necessary. FIGS. 5 and 11 illustrate an embodiment of a lug and slot configuration, according to the subject invention. A person skilled in the art can determine any of a variety of mechanisms and structures that could be utilized with the embodiments of the subject invention to demountably secure a video device to a platform. It should be understood that such variations that perform the same function, in substantially the way, with substantially the same result are within the scope of the subject invention.

Once a video device is coupled to a platform, it usually needs to be balanced to achieve the correct horizontal angle, e.g., a left to right horizontal horizon, and longitudinal angle, e.g., angled up towards the sky or down towards the ground. Advantageously, the embodiments of the subject invention utilize a counterbalance system 15 to adjust a video device to the desired horizontal and longitudinal angles. One embodiment provides at least one, ideally at least two, opposing counterweights that can be employed to precisely and easily adjust the balance of a video device. A further advantage of the embodiments of the subject invention is that the video device does not necessarily have to be centered on a platform 70. With the use of the counterbalance system, a video device can be easily balanced regardless of where the video device is placed on the platform, assuming it is properly secured thereto.

In one embodiment, dual opposing counterweights 16 are utilized to obtain both the horizontal angle 500 and the longitudinal angle 600 of a video device. Counterweights can be operably connected to a pole in any location that can provide proper adjustments. In a particular embodiment, an upper counterweight 30 is operably connected at, or about, the proximal end of the pole. In a still further particular embodiment, a lower counterweight 40 is operably connected at or about the distal end of the pole. In specific embodiment, the above-described gimbal system is operably connected to the pole between the upper counterweight and the lower counterweight. A counterweight can have two, usually, but not necessarily, equal weight objects fixedly attached to opposite ends of an elongated rod 17. The rod 17 can be moveably attached to the pole 20, such that the pole can function similar to the fulcrum on a balance beam. By moving the rod 17 relative to the pole, the fulcrum can change, allowing the counterweights to apply more or less downward force in one or the other direction. When utilized in conjunction with the above-described gimbal system, dual counterweights 17 can be used to balance a video device in at least four directions— left to right and front to back. This system can also compensate for changes in the roll and pitch of a video device.

In a specific embodiment, an upper counterweight 30 is operably connected to the pole 20 with a rod 31 being substantially parallel to the horizontal angle 500, shown in FIG. 6, such that a weight object 32 is located at about the left side and at about the right side of a video device. This allows the upper counterweight 30 to be used to adjust or balance the lateral angle 500 to obtain a horizontal horizon. FIGS. 3, 5, and 6 illustrate an example of this embodiment. In a further specific embodiment, a lower counterweight 40 is operably connected to the pole 20 with a rod 41 being positioned substantially perpendicular to the rod 31 of the upper counterweigh 30, such that a weight object 42 of the lower counterweight is located at about the front side and at about the back side of the video device. This allows the lower counterweight to balance the fore/aft angle 600, shown in FIG. 6, of the video device. FIGS. 2, 4, and 10 illustrate an example of this embodiment.

The length and diameter of a rod can vary depending upon several factors known to those with skill in the art. Such factors can include, but are not limited to, the size and weight of the weight objects affixed to the rod, the rod material, the length of the pole, the number of counterweights utilized with the device, and the method by which the rod can be adjusted, as discussed below. In one embodiment, the length of a rod is between approximately 3.0 inches and approximately 6.0 inches. In a more particular embodiment, the length of a rod is between approximately 4.0 inches and approximately 5.0 inches. It should be understood that variations in the length and/or diameter of a rod such that it provides the same function, in substantially the same way, with substantially the same result are within the scope of the subject invention.

Figure 7:
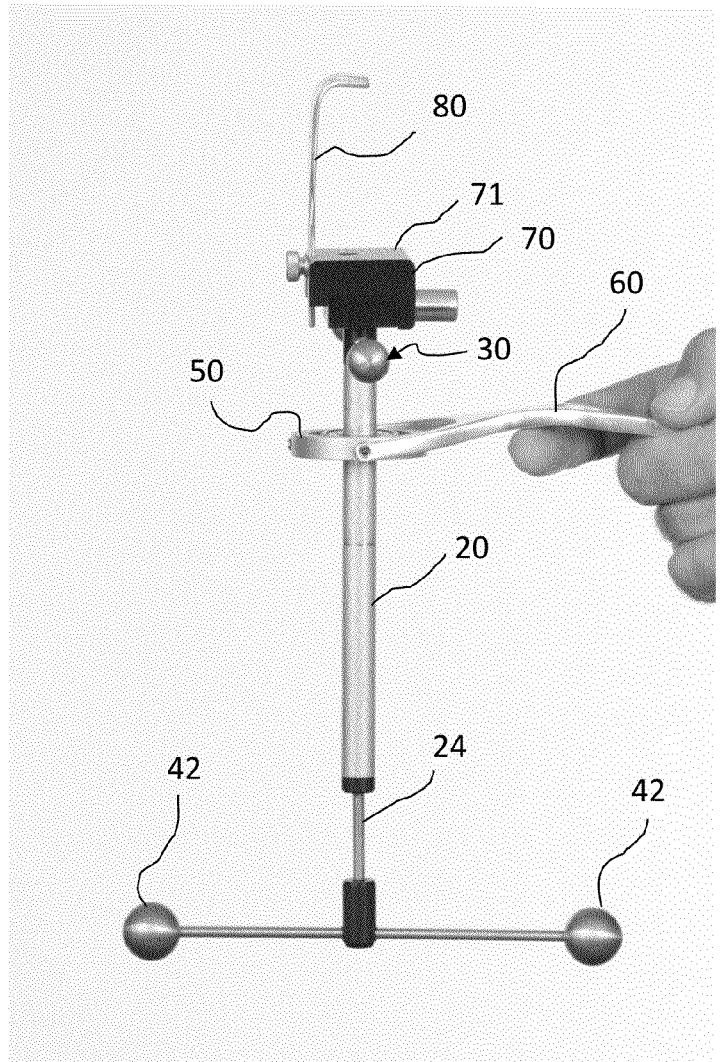
FIG. 7 is a photograph of a left side elevation view of a stabilizer apparatus embodiment according to the subject invention. This photograph shows how the stabilizer apparatus can be held.

The adjustment mechanism of a counterweight can be important, particularly for smaller devices, where slight changes can affect the balance. The ability to adjust the counterweights during use can also be helpful. In one embodiment, the pole is configured with one or more pass-through holes 23 through which a rod can be moved. In one embodiment, a separate member 27 having a pass-through hole 23 therein is affixed to a pole. FIG. 9, illustrates an example of a separate member 27 affixed to a pole 20 having a pass-through hole 23 for a rod. In another embodiment, a pass-through hole is formed through a pole, or one or more sections 22 thereof. FIGS. 3, 4, 8, 11, and 9 illustrate examples of pass-through holes within a pole. In a particular embodiment, a pass-through hole is located at or about the distal end of a movable section 22. In a more particular embodiment, a pass-through hole 23 is located in a section 22 having continuous threading 24 that allows it to be moved relative to another section, such as, for example, by screwing one section into or out of another section, to adjust the length of the pole. FIGS. 3, 7, and 9 illustrate one example of a pole with a threaded section that can be turned or screwed to adjust the overall length of the pole, with a pass-through hole at about the distal end 400.

In one embodiment, a pass-through hole 23 has dimensions, or is otherwise configured to allow a rod 17 to slide in two directions. In a further embodiment, the dimensions of a pass-through hole provide sufficient tolerance that the rod can be maintained in a position within the pass-through hole by frictional force. Thus, the rod can be moved when sufficient force is applied to overcome the frictional force.

In an alternative embodiment, a pass-through hole 23 and a rod 17 comprise compatible continuous threading. In a further embodiment, a rod with continuous threading thereon can be turned or screwed in two directions within a compatibly continuous threaded pass-through hole. This can allow a counterweight to be adjusted as necessary in two different directions to balance a video device on a platform 70. FIGS. 4, 5, 6 and 9 illustrate examples of continuous threaded, pass-through holes 23 in which a compatibly continuous threaded rod 17 is cooperatively engaged. In a still further embodiment, the continuous threading of a rod and a pass-through hole is substantially fine, i.e., has a sufficient number of threads per inch, that adequate incrementally small corrections can be made to the position of the counterweights to precisely balance a video device 150 on a platform 70. In yet a further embodiment, a sufficient length of the rod comprises continuous threading so that the counterweights can be moved sufficiently in either direction to balance any of a variety of video devices utilized with a stabilizer apparatus 10 of the subject invention. A continuous threaded rod 17 employed with a compatibly continuous threaded pass-through hole 23 can be advantageous because it can permit the counterweights 16 to be adjusted with one hand. It can also allow a user to make careful adjustments that do not cause the pole to swing or rotate in a wide arc. This can allow balance corrections to be made to a stabilizer apparatus 10 while in use, with minimal or no effect on the video production.

Figure 12:
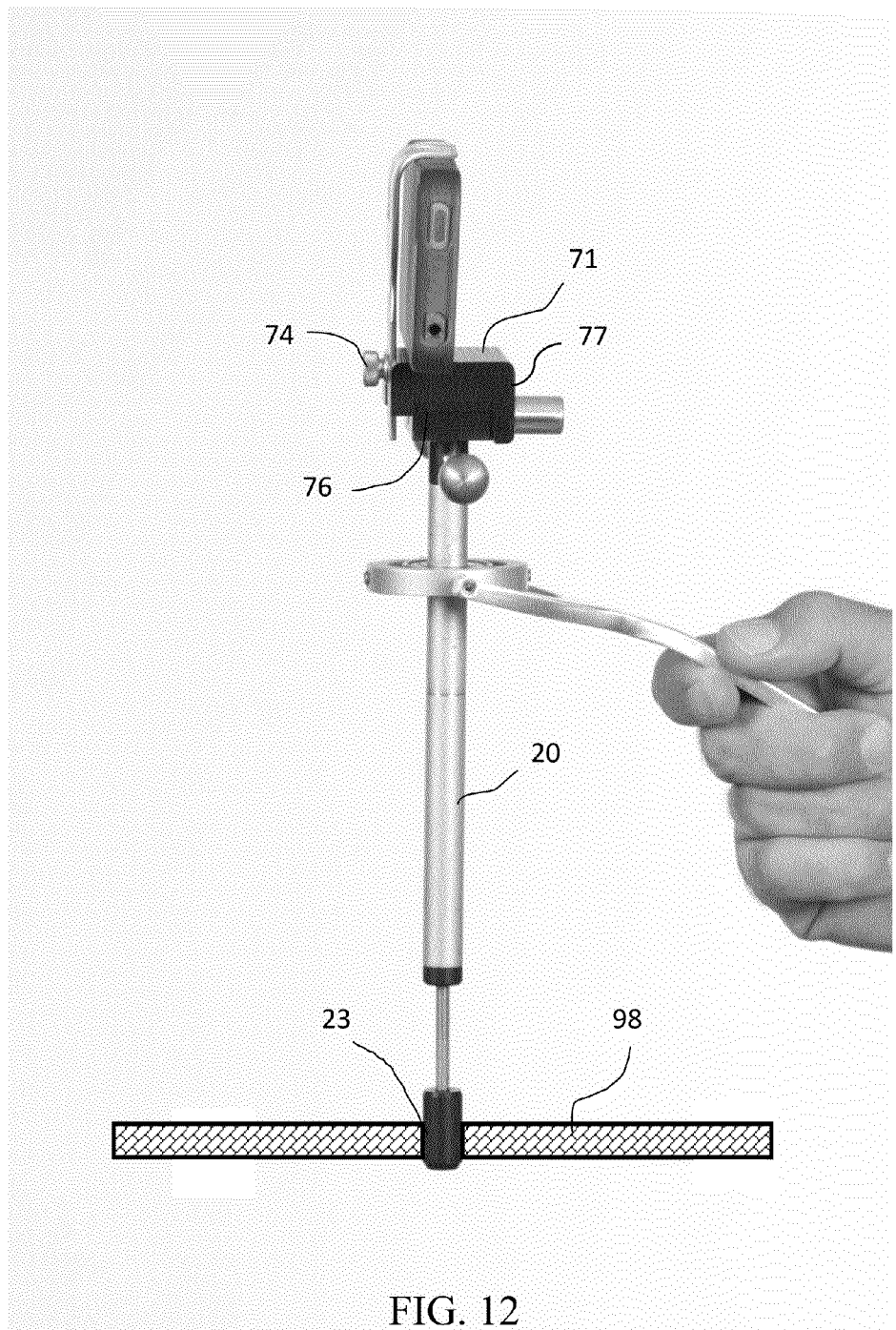
FIG. 12 is a modified photograph of a left side elevation view of a stabilizer apparatus according to the subject invention. This modified photograph shows an example of a weighted rod that can be used to balance the operably attached video device.

In another embodiment, the rod can be enlarged or can be comprised of one or more materials that provide a weighted-rod 98 of pre-determined mass. This can eliminate the counterweights located at the ends of a rod and allow the weighted-rod to be utilized as a sort of balancing beam in conjunction with a pass-through hole 23. FIG. 12 illustrates an embodiment of a weighted-rod 98 operably connected to a pass-through hole 23 in a rod section 22. In a further embodiment, the weighted rod and pass-through hole 23 can have compatible continuous threading, as described above. In order to balance a video device 150, the weighted-rod can be turned in one of two directions to adjust the weight of the rod as necessary to balance a video device. Other methods of providing adjustable counterweight to balance a video device can also be utilized with the embodiments of the subject invention. A person with skill in the art, having benefit of the subject disclosure, would be able to determine any of a variety of devices and techniques to provide two or more counterweights on a stabilizer apparatus of the subject invention, to facilitate balancing a video device. Such variations that provide the same function, in substantially the same way, with substantially the same result are within the scope of the subject invention.

Lastly, the stabilizer apparatus embodiments of the subject invention are most useful when employed as a moveable platform for a video device. One of the many advantages provided by the embodiments of the subject invention is the ability to move a video device through a scene and to produce a smooth, almost flying-like motion that can simulate walking or running without shaky or jerky production. This necessitates being able to support the device in order to move through a scene, ideally by holding it by one or both hands. In order to ensure that the components of the apparatus move freely, it can be critical that the method of supporting the device does not interfere with the gimbal 50 or pole 20. Thus, the stabilizer apparatus will advantageously be held in such a way that provides the pole with full available mobility.

In one embodiment, a handle device 60 is affixed to the outer ring 52 of the gimbal 50. In one embodiment, described above, the outer ring 52 of the subject invention corrects for changes in pitch, i.e., fore and aft, motion of the pole. Thus, the handle device can be attached to the outer ring so that when held, the outer ring can continue to function to correct for changes in pitch. In one embodiment, the handle device has a movable or rotatable attachment, such that the handle can rotate in generally the proximal and distal directions, or up and down. This allows the gimbal rings, particularly the outer gimbal ring, to continue to function as described previously, but also allows the entire stabilizer device to be moved up or down, as well as moved horizontally. There are any of a variety of rotatable attachment mechanisms that can be utilized to rotatably attach a handle to an outer gimbal ring. Such variations which provide the same function, in the same way with substantially the same result are within the scope of the subject invention.

One embodiment utilizes a handle configuration that is similar to a clevis fastener. Clevis fasteners are known in the art and usually comprise three components: a clevis, a clevis pin, and a tang. The clevis is a U-shaped piece with one hole at the end of the prongs to accept one or two clevis pins. The clevis pin is similar to a bolt, but is usually only partially threaded or has a cross-hole for receiving a cotter pin. Importantly, the clevis is able to rotate on the clevis pin or pins. The tang is any object that fits within the space between the prongs of the clevis and can be held in place by one or two clevis pins. Thus, the clevis can rotate relative to the tang.

Figure 8:
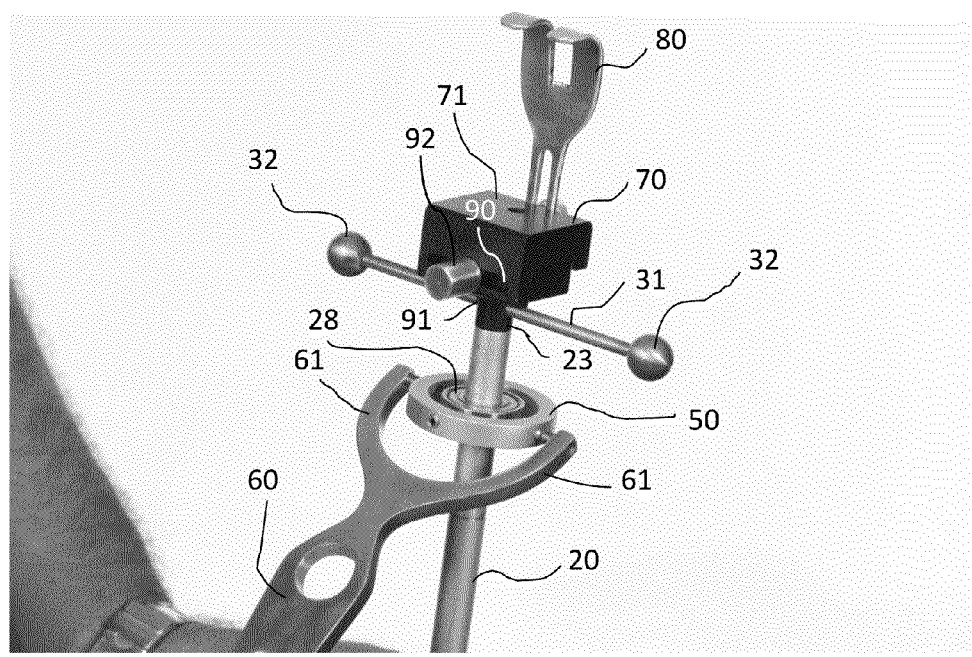
FIG. 8 is a photograph of a right side perspective view of the proximal end of a stabilizer apparatus according to the subject invention.
Figure 9:
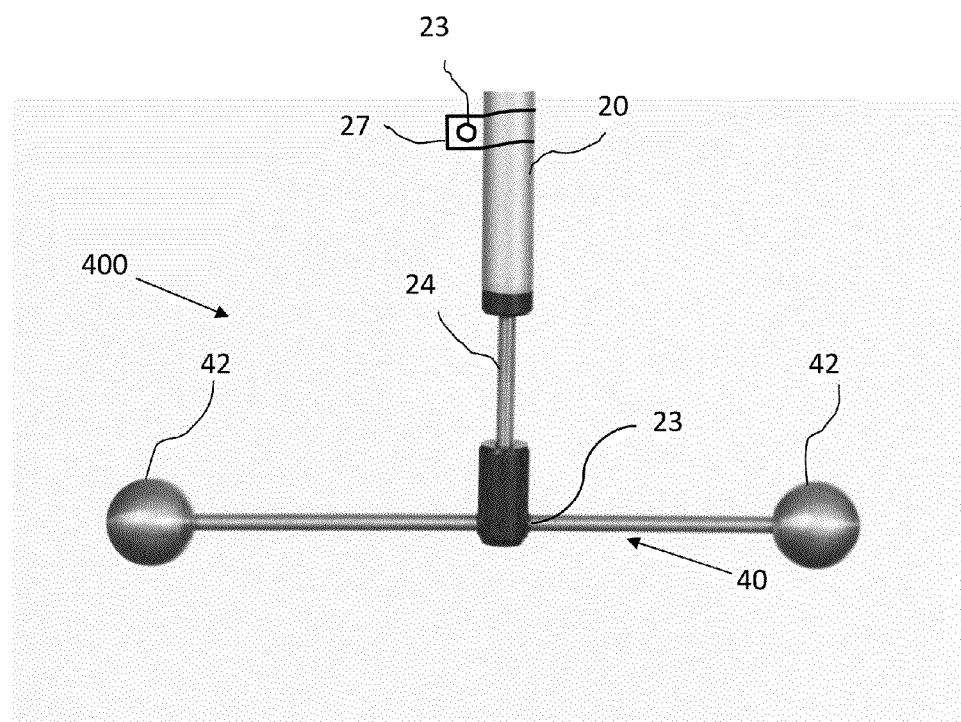
FIG. 9 is a photograph of a left side elevation view of the distal end of a stabilizer apparatus according to the subjection invention. This view shows a threaded rod with counter weights.

FIGS. 3, 8 and 11 illustrate a specific embodiment of a handle device 60 that is configured similarly to a clevis fastener that is rotatably affixed to an outer gimbal ring 52. With this embodiment, the handle is configured similarly to a clevis fastener, such that it has a forked end with two prongs 61. The distance between the prongs can be at least as great as the diameter of the outer gimbal ring, which operates like a tang. In one embodiment each prong is rotatably attached by a clevis pin 62 to each side of an outer gimbal ring. More specifically, each prong is rotatably attached with a clevis pin 62 to points on the outer gimbal ring that are located at or about opposite poles of the outer gimbal ring. In a further embodiment, the space between prongs is at least as great as the radius of the outer gimbal. When the prongs are attached to the outer gimbal ring, the outer gimbal ring can rotate in a longitudinal direction between the tines, so that it continues to correct for changes in pitch. The ability of the handle to rotate relative to the motion of the outer gimbal ring allows the counterbalance system in conjunction with the gimbal 50 to maintain the balance of a video device.

When operating a video device 150 with the stabilizer apparatus 10, the handle can be used to move the entire system very easily through a variety of motions. As described above, the gimbal system, in conjunction with the bearings, can hold a video device in a steady direction, minimizing effects of yaw, pitch and roll, which is advantageous. However, there may be situations in which it is desirable to temporarily move a video device independently of the stabilizer apparatus, or hold a video device in one position. For example, it may be desirable to rotate the camera to the left or right (change the yaw) or tilt the video device up or down (change the pitch). This can be easily accomplished by holding or touching the pole or another part of the stabilizer apparatus, or even the video device. However, the ability to completely control the motion of a video apparatus with one hand can be helpful.

Figure 15:
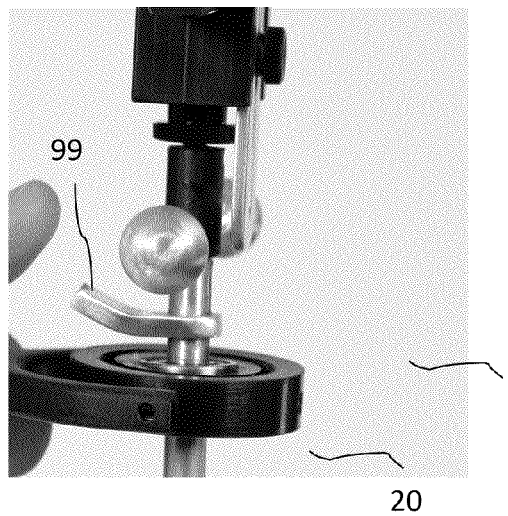
FIG. 15 is a photograph of a right side elevation view of a stabilizer apparatus according to the subject invention. In this embodiment, the thumb guard is positioned above the gimbal on the pole.
Figure 16:
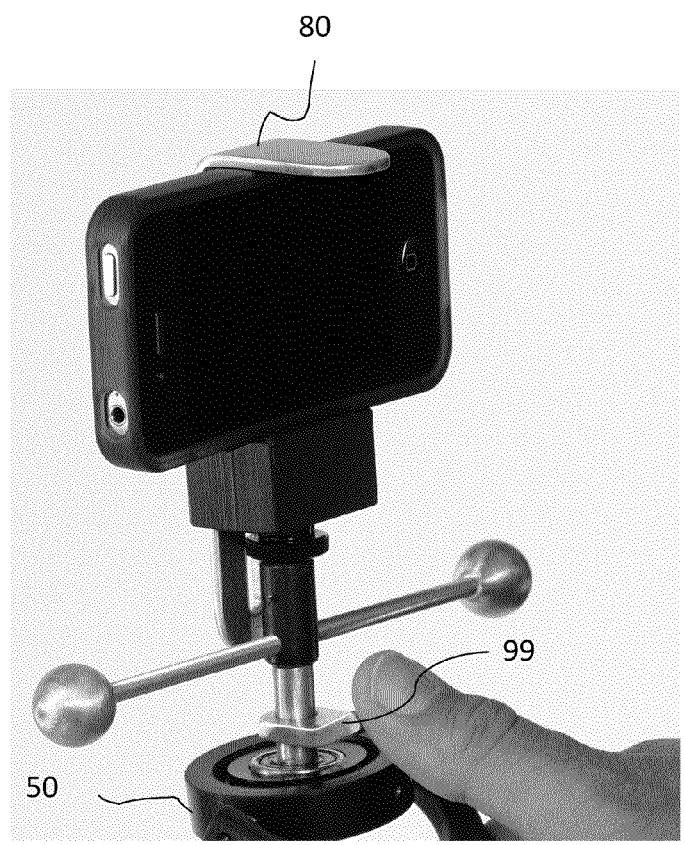
FIG. 16 is a photograph of a rear perspective view of a stabilizer apparatus of the subject invention. This photograph shows how one hand can be used to hold the stabilizer device and utilize the thumb guard to control the motion of the stabilizer apparatus and a video device thereon.

In one embodiment, a thumb guard 99 is fixedly attached to the pole. Advantageously, a thumb guard can be utilized with the same hand that manipulates the handle device 60, so that the entire range of motion of a video device can be controlled with one hand. In one embodiment, the thumb guard is an extension from the pole 20 towards the handle device, such as shown, for example, in FIG. 13. The thumb guard can be a rigid attachment to the pole, or, alternatively, be a part of or extension of the pole, so that by manipulating the thumb guard 99 the position of the pole can be controlled and, thus, the position of a video device attached thereto. The length of a thumb guard, or the distance to which it extends from the pole, can vary. Ideally, it will extend sufficiently that a person holding the stabilizer apparatus with one hand can use the thumb, or, perhaps, an index finger, on the same hand to manipulate the thumb guard, such as shown, for example, in FIG. 13. It can also be preferable if the thumb guard is positioned and has sufficient length that manipulation thereof does not cause contact with the gimbal or bearings themselves. This can allow a user to maintain contact with the thumb guard for instantaneous use. Thus, in a further embodiment, the thumb guard can be affixed to a pole at a location proximal to the gimbal, which is shown, for example, in FIGS. 15 and 16. The thumb guard can provide the ability to precisely control the angle and direction of a video device, but allow the stabilizer apparatus to continue to operate normally upon release of the thumb guard.

Advantages of the stabilizer apparatus 10 embodiments of the subject invention include an ability to easily and securely balance a video device with a counterbalance system on a weighted gimbal system that can maintain the video device at one or more desired angles. The components of the stabilizer apparatus permit a video device to be easily balanced, even when the apparatus is in use. The interaction of the components also allows the apparatus to be moved in a fluid motion that inhibits jerky or unsteady motions during video production. Most advantageous is the ability of the stabilizer apparatus to operate with any of the small hand-held video devices commonly in use today to provide professional videographic results.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and various modifications or changes in light thereof will be suggested to persons skilled in the art and are to be included within the spirit and purview of this application.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. Further, when a particular feature, structure, or characteristic is described in connection with any embodiment, it is within the purview of one skilled in the art to affect such feature, structure, or characteristic in connection with other ones of the embodiments.

The invention has been described herein in considerable detail, in order to comply with the Patent Statutes and to provide those skilled in the art with information needed to apply the novel principles, and to construct and use such specialized components as are required. However, the invention can be carried out by specifically different equipment and devices, and various modifications, both as to equipment details and operating procedures, can be effected without departing from the scope of the invention itself. Further, although the present invention has been described with reference to specific details of certain embodiments thereof and by examples disclosed herein, it is not intended that such details should be regarded as limitations upon the scope of the invention except as and to the extent that they are included in the accompanying claims.

We claim:

1. A stabilizer apparatus comprising:
a pole having a proximal end and a distal end;
a gimbal system operably connected to the pole between the proximal end and the distal end;
a counterbalance system comprising,
an upper counterweight comprising a rod operably connected to one location on the pole, between the gimbal and the proximal end, the upper counterweight being adjustable by moving the rod in a horizontal direction,
a lower counterweight comprising a rod operably connected to another location on the pole, between the gimbal and the distal end, the lower counterweight being adjustable by moving the rod in a horizontal direction that is different from the horizontal direction of the upper counterweight; and
a mechanism for demountably attaching a device to the stabilizer apparatus.

2. A stabilizer apparatus according to claim 1, wherein the pole comprises at least two sections operably connected so as to adjust the length of the pole.

3. A stabilizer apparatus according to claim 2, wherein one section has continuous threading compatible with continuous threading on another section, such that the length of the pole is incrementally adjustable by turning at least one of the at least two sections.

4. A stabilizer apparatus according to claim 3, wherein the upper counterweight and the lower counterweight are each operably connected to different sections of the pole.

5. A stabilizer apparatus according to claim 4, wherein the upper counterweight rod and the lower counterweight rod each comprise threading and the pole further comprises threaded pass-through holes in which each threaded rod can be operably disposed to incrementally adjust the positions of each counterweight in their respective horizontal directions.

6. A stabilizer apparatus according to claim 4, wherein the gimbal system comprises at least two rings that maintain the position of the mechanism for demountably attaching the device.

7. A stabilizer apparatus according to claim 6, wherein a first outer ring corrects for changes in the pitch angle of the mechanism.

8. A stabilizer apparatus according to claim 6, further comprising at least three rings in the gimbal system.

9. A stabilizer apparatus according to claim 7, wherein a second central ring corrects for changes in the roll angle of the mechanism.

10. A stabilizer apparatus according to claim 9, wherein the pole is rotatably attached through the center of the second central ring.

11. A stabilizer apparatus according to claim 10, wherein the pole is attached through the center of the second central ring with one or more bearings.

12. A stabilizer apparatus according to claim 11, wherein the pole has an axial rotation of at least 360° in two directions.

13. A stabilizer apparatus according to claim 11, further comprising a handle rotatably attached to the outer ring for supporting and moving the stabilizer apparatus.

14. A stabilizer apparatus according to claim 12, further comprising one or more bearing stops that limit axial rotation of the pole.

15. A stabilizer apparatus according to claim 13, wherein the handle rotates on the outer ring in the direction of the proximal end and distal end.

16. A stabilizer apparatus according to claim 15, wherein the handle comprises a clevis attachment to the outer gimbal ring.

17. A stabilizer apparatus according to claim 13, wherein the gimbal system comprises more than two rings.

18. A stabilizer apparatus according to claim 13, further comprising a thumb guard usable with the handle.

19. A stabilizer apparatus according to claim 4, wherein each end of the counterweights are equally weighted.

20. A stabilizer apparatus according to claim 19, wherein the counterweights are operably attached to the pole perpendicular to each other.

21. A stabilizer apparatus according to claim 19, wherein the upper counterweight is attached so as to be lateral to a device demountably attached to the apparatus, such that the upper counterweight can be used to adjust the lateral angle of the device.

22. A stabilizer apparatus according to claim 19, wherein the lower counterweight is attached so as to be transverse to a device demountably attached to the apparatus, such that the lower counterweight can be used to adjust the fore and aft angle of the device.

23. A stabilizer apparatus according to claim 3, wherein the at least two sections of the pole are adjustable to a length between 5.0 inches and 2.0 feet.

24. A stabilizer apparatus according to claim 3, wherein the at least two sections of the pole are adjustable to a length between 6.0 inches and 1.5 feet.

25. A stabilizer apparatus according to claim 1, wherein the mechanism for demountable attaching a device comprises a platform.

26. A stabilizer apparatus according to claim 25, further comprising an adjustable arm for securing the device on the platform.

27. A stabilizer apparatus according to claim 26, wherein the platform further comprises a movable carriage on which the device can be secured.

28. A stabilizer apparatus according to claim 27, wherein the carriage is movable in at least a lateral direction.

29. A stabilizer apparatus according to claim 1, wherein the mechanism for demountably attaching the device comprises a screw.

30. A stabilizer apparatus according to claim 29, wherein the screw is attached to at or about the proximal end of the pole.

31. A stabilizer apparatus according to claim 29, wherein the screw is a dual-headed screw having one end that can be removably attached to the pole and another end to which a device can be demountably attached.

* * * * *